PNEUMATIC OUTLET ASSEMBLY FOR HOPPERS

Original Filed Aug. 5, 1968 4 Sheets-Sheet 1

INVENTOR
WILLIAM D. MUNDINGER
BY Edward O. Vogel
ATT'Y.

PNEUMATIC OUTLET ASSEMBLY FOR HOPPERS

Original Filed Aug. 5, 1968 4 Sheets-Sheet 2

INVENTOR
WILLIAM D. MUNDINGER
BY Hilmark O. Vogel
ATT'Y.

PNEUMATIC OUTLET ASSEMBLY FOR HOPPERS

Original Filed Aug. 5, 1968 4 Sheets-Sheet 3

INVENTOR
WILLIAM D. MUNDINGER
BY Edmund O. Vogel
ATT'Y.

PNEUMATIC OUTLET ASSEMBLY FOR HOPPERS

Original Filed Aug. 5, 1968 4 Sheets-Sheet 4

INVENTOR
WILLIAM D. MUNDINGER
BY Edward O. Vogel
ATT'Y.

United States Patent Office

Re. 27,471
Reissued Sept. 5, 1972

27,471

PNEUMATIC OUTLET ASSEMBLY FOR HOPPERS

William D. Mundinger, Highland, Ind., assignor to Pullman Incorporated, Chicago, Ill.

Original No. 3,527,503, dated Sept. 8, 1970, Ser. No. 750,224, Aug. 5, 1968. Application for reissue Sept. 30, 1970, Ser. No. 76,962

Int. Cl. B65g *53/40*

U.S. Cl. 302—52 12 Claims

Matter enclosed in heavy brackets [ ] appears in the original patent but forms no part of this reissue specification; matter printed in italics indicates the additions made by reissue.

ABSTRACT OF THE DISCLOSURE

A pneumatic outlet assembly includes a pan which is connected to the discharge end of a hopper and comprises a stationary tube with an inner section disposed within the pan and having sections projecting outwardly with respect thereto. The inner section is slotted on its bottom surface and is further cut out on opposite sides to provide apertures adjacent opposite ends of the pan. A control tube is rotatably mounted in the stationary tube and includes an elongated intake slot and separate cleanout slots which provide for effective cleanout of the pan and tubes after most of the material has been removed by suction. The control tube is movable to a plurality of indexed positions to provide for the most efficient and rapid discharge of material from the hopper.

*This application is a reissue application of Ser. No. 750,224, filed Aug. 5, 1968, which application matured into U.S. Pat. No. 3,527,503.*

BACKGROUND OF THE INVENTION

Field of the invention

The invention relates to the art of hopper discharge arrangements wherein hoppers normally carried by vehicles such as trailers or railway cars transport bulk materials. The discharge of such bulk materials from the hopper is generally effected by a discharge assembly which may either be gravity or pneumatic or a combination of both. The present invention is concerned with a hopper discharge arrangement to be operated by means of a pneumatic outlet assembly which is suitably connected to a vacuum unloading system.

Description of the prior art

The prior art concerned with pneumatic outlets for discharging hoppers has included stationary tubes provided with suitable openings and a control tube rotatable therein with intake provisions for withdrawing material from a discharge pan connected to a hopper. In order to provide for the most efficient discharge, attempts have been made which includes certain opening configurations both in the outer tube and in the control tube with the objective that discharge would be rapid and that the hopper would be effectively emptied. In prior art structures some degree of success has been accomplished but a more improved arrangement has been long needed. The present invention provides an efficient arrangement which permits rapid discharge and complete final cleanout after the majority of the material has been drawn from the hopper.

SUMMARY

The invention comprises an improved structure of a pneumatic outlet assembly which includes intake suction apertures critically located in a stationary tube within a discharge pan for providing and effecting the most rapid discharge of material through a control tube. The control tube also includes intake slots and cleanout oper ings which are so located as to effect an efficient an complete cleanout of any residue of material remainin after practically all of the bulk material has been witl drawn from the hopper and discharge pan.

DESCRIPTION OF THE PREFERRED EMBODIMENT

Figure 1:
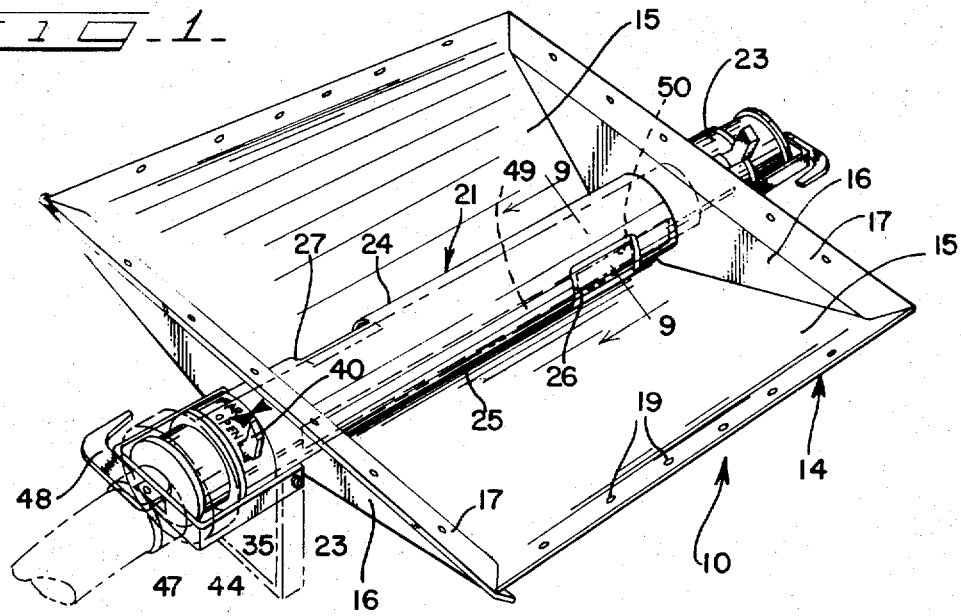
FIG. 1 is a perspective view of a pneumatic outlet as sembly.

Referring particularly to FIG. 1 a pneumatic outl assembly is designated by the reference character 10 an includes a hopper structure 11 having four sloping wall 12 terminating in a discharge opening 13 as best show in FIG. 1. The discharge opening 13 is enclosed by mean of a pan or material receiving receptacle 14 having dowr wardly sloping bottom walls 15 connected to a horizont wall portion 15'. The pan or receptacle 14 also include on opposite sides thereof walls 16 provided with flange 17 which are suitably connected by means of bolt an nut assemblies 18 through openings 19 provided in th bottom walls 15 and flanges 17 as best shown in FIGS. and 11. The walls 16 are each provided with aligned oper ings 20 which support a tubular member generally re ferred to by the reference character 21. If desired th walls 16 may also be inclined so as to slope downwardl inwardly.

Figure 4:
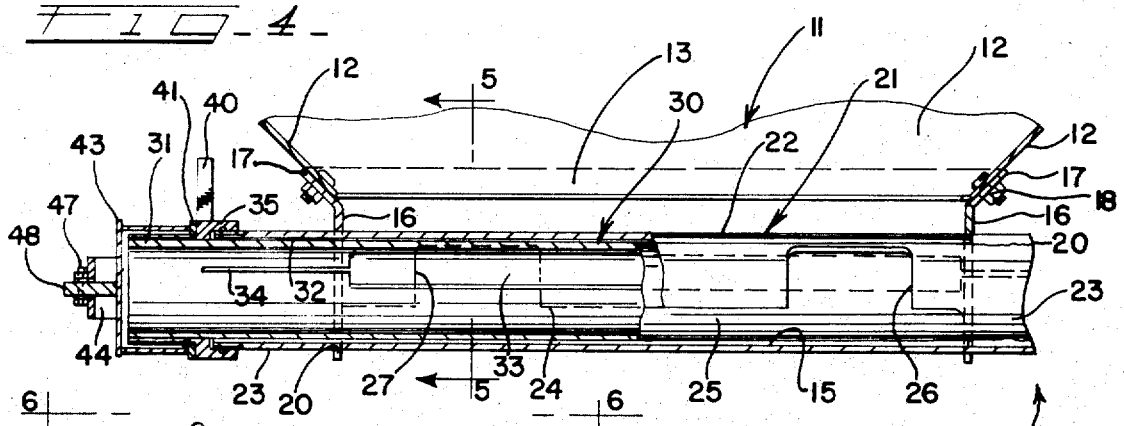
FIG. 4 is a cross-sectional view taken substantiall along the line 4—4 of FIG. 3 with interior portions of control means broken away to better illustrate the di closure.

The tubular member 21 comprises an inner tubula section 22 and outer tubular sections 23 extending fror the tubular section 22 outwardly from the walls 16 a best shown in FIGS. 1 and 4. The inner tubular sectio 22 is open at its bottom substantially coextensive with it length within the pan 14 and includes arcuate wall poi tions 24 and 25 which terminate at their ends a distanc above the sloping bottom wall portions 15 and therefor provide a slot generally designated by the reference chai acter 25' as best shown in FIGS. 5, 7, 9 and 12.

Figure 5:
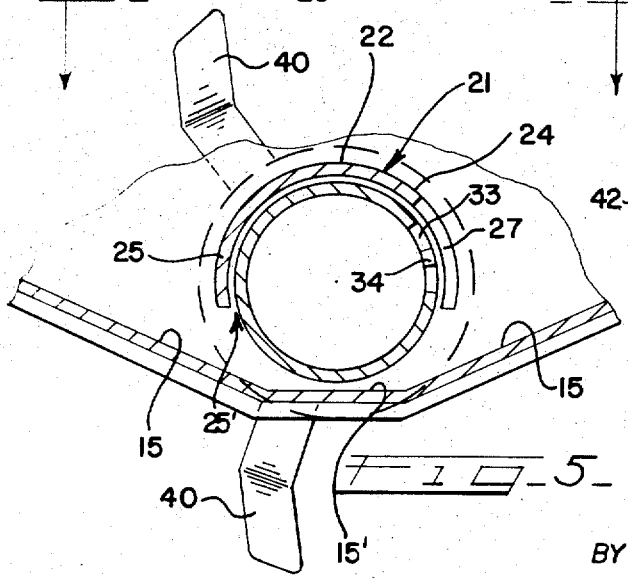
FIG. 5 is a cross-sectional view taken substantiall along the line 5—5 of FIG. 4.
Figure 14:
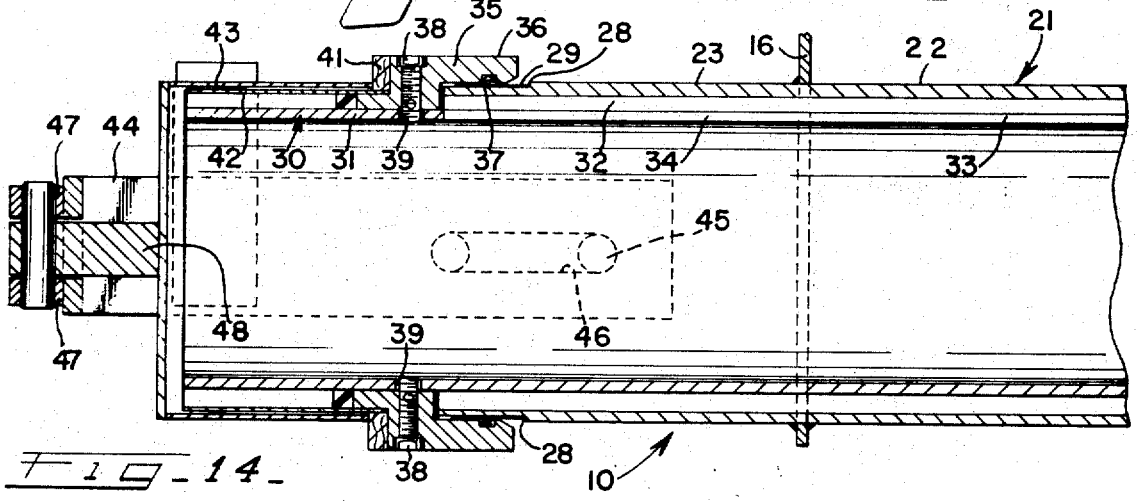
FIG. 14 is an enlarged cross-sectional view showin operating details for a tubular extension of the pneumati outlet assembly.

The arcuate wall portion 25 is provided with a rectangu lar aperture 26 and as best shown in FIG. 5 the wall poi tion 24 is provided with a rectangular aperture 27 sai apertures, as best shown in FIG. 1, being disposed o pposite ends of the tubular section 22 substantially adıcent vertical walls 16. As best shown in FIG. 14 the nds of the outer tubular sections 23 are each provided vith a circumferentially extending undercut portion 28 vithin which the nylon bearing 29 is suitably secured.

A control tube 30 is rotatably positioned within the ıbular member 21 and includes at opposite ends tubular xtension portions 31 which project outwardly on oppote sides of the pan 14 and outwardly from the opposite nds of the outer tubular sections 23. The tubular extenon portions 31 form with the outer sections 23 an annuır space 32. The control tube 30 is also provided with slot 33 which extends substantially the width of the an 14. The tubular extensions 31 are also provided with narrower slot 34 which is in communication with the ot 33 and provides for the cleanout function which will e described. The control tube extension 31 has connected ıereto a collar 35 having an annular flange 36 to which secured a ring seal 37 and which engages the nylon ıdial bearing 29 in sealing and sliding relation. Set screws 8 suitably connect the collar through openings 39 through ıe extensions 31 to provide for rotation of the control ıbe 30 upon rotation of the collar 35. Such rotation is ffected by means of a pair of handles 40 which are conected to each collar 35. A gasket 41 is suitably bonded the collar 35 and a sleeve 42 connected to the collar 5 projects outwardly with respect thereto. The annular ɔace between the sleeve 42 and the outer portion of ıe extension 31 serves to suitably receive the pipes or ıbing of a vacuum unloading system in conventional ıanner which need not further be described.

In the closed position of the control tube 30 a cap 43 positioned over the sleeve 42. The cap 43 is retained ı closed position by means of a bail 44 suitably pivoted n pins 45 projecting outwardly on opposite sides from ıe outer tubular section 23. The bail 44 is provided with ots 46 pivotally engaging the pins 45 and facilitating inging and securing of the bail 44 in position. The cap 3 is provided with ears 47 to which a camming lever 48 pivotally connected.

THE OPERATION

Figure 2:
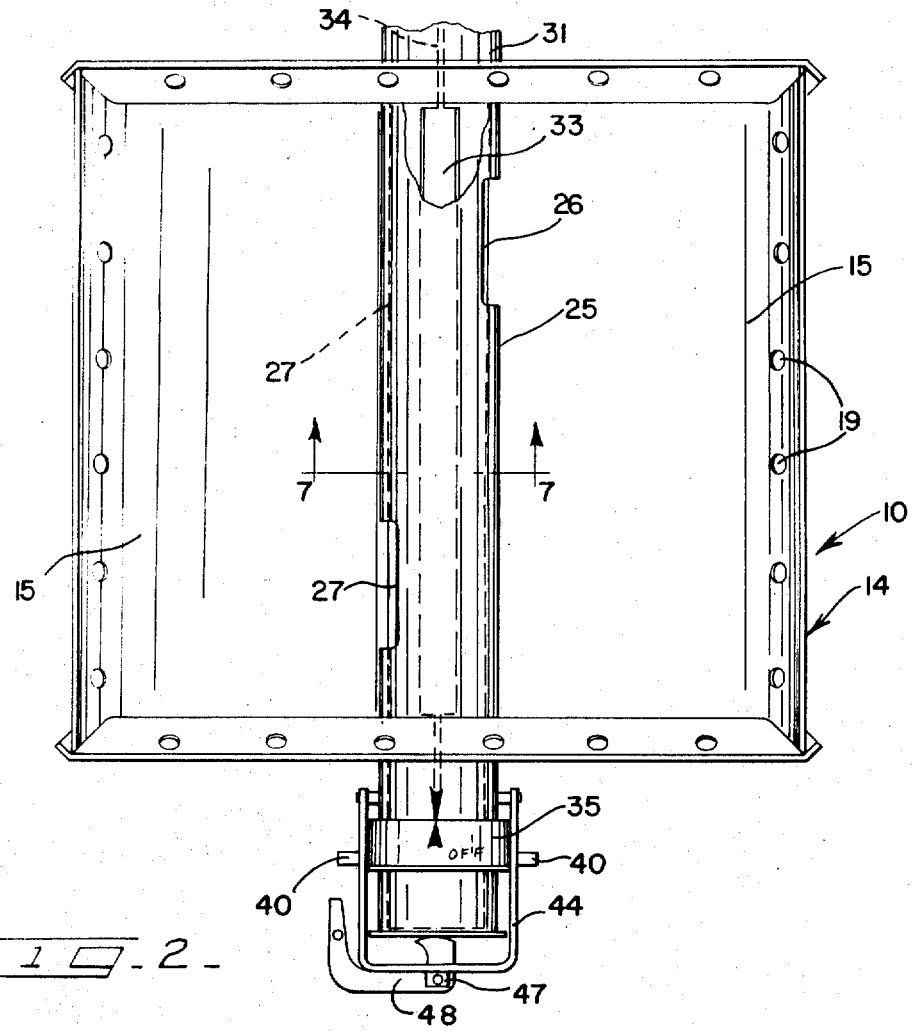
FIG. 2 is a plan view of the outlet assembly shown i FIG. 1.
Figure 3:
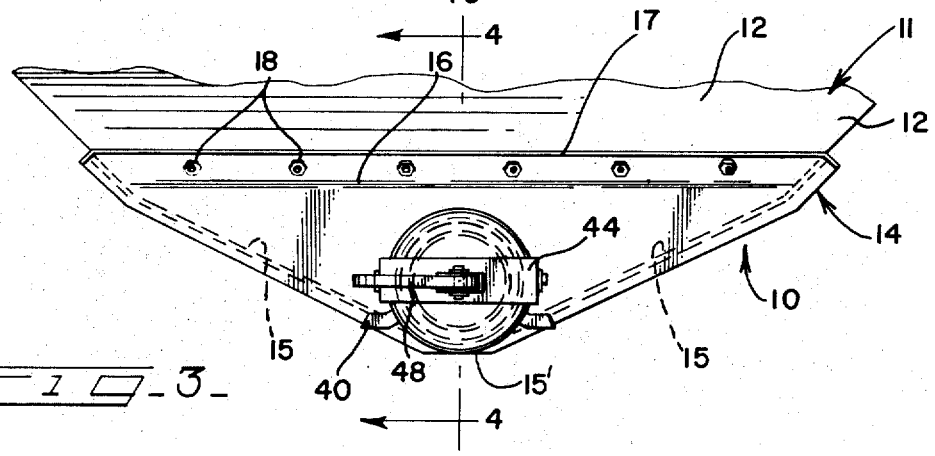
FIG. 3 is a side elevational view of the outlet assembl of FIG. 2.
Figure 7:
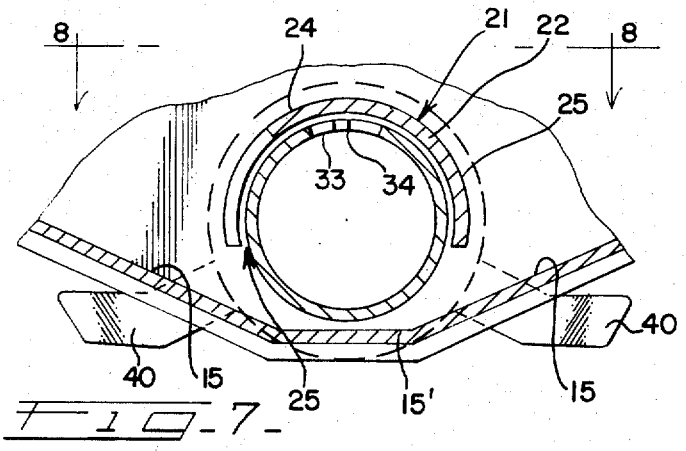
FIG. 7 is a cross-sectional view taken substantiall along the line 7—7 of FIG. 2.
Figure 8:
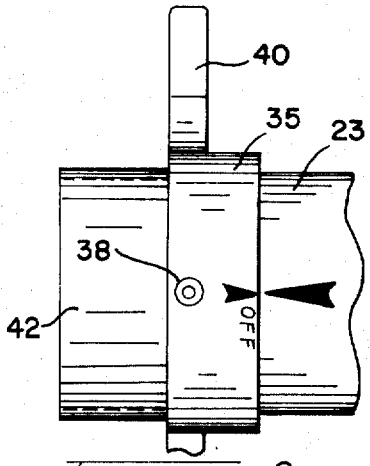
FIG. 8 is a view taken substantially along the line 8— of FIG. 7.

As best indicated in FIG. 1 the outwardly projecting ructures of the pneumatic outlet assembly 10 are symıetrical and a vacuum unloading system may be conected to either side of the pan 14. In the transport posion, the collar, as shown in FIG. 2, is rotated to the ff position wherein the arrow on the collar 35 will coıcide with the arrow marking provided on the outer ıbular section 23. In this position, as shown in FIG. 7, ıe slot 33 of the control tube 30 is covered by the arcuıe walls 24–25. When the vehicle containing the hopper 1 arrives at the unloading site one of the caps 43 is reıoved by rotating the lever 48 which then permits the ail 44 to swing downwardly. Prior to rotation of the ɔntrol tube 30, it is necessary to unlock the camming ver 48 and permit the bail 44 to swing to its down osition.

A suitable tube from a vacuum unloading system can ow be inserted to connect around the outer surface of ıe control tube 30 so that the operation of unloading ın begin. It is contemplated that this assembly can also e used with a probe system. A probe system is a vacuum nloading means wherein a tube has connected thereto pipe, the pipe having an intake aperture which receives ıaterial from the pan and discharges the same. In FIG. 1 probe is shown as being inserted within the assembly nd is designated at 49 which includes an opening 50 in egistry with the aperture 26.

Figure 9:
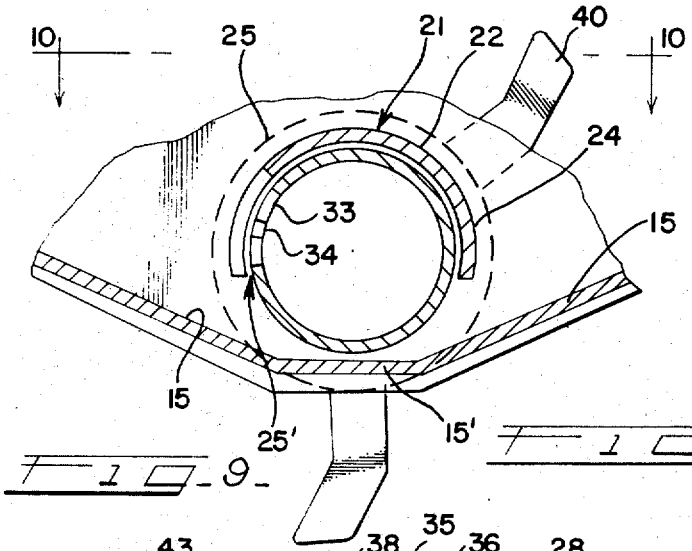
FIG. 9 is a cross-sectional view taken along the lin 9—9 of FIG. 1.
Figure 10:
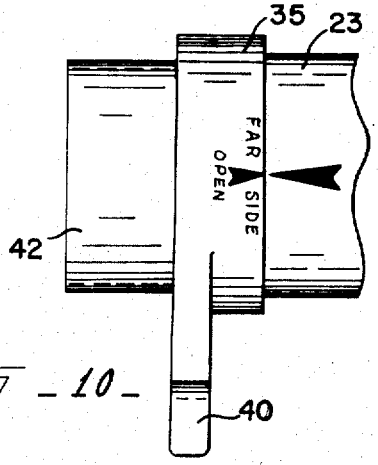
FIG. 10 is a view taken substantially along the lin 10—10 of FIG. 9.

At the beginning of the operation the operator now ırns the collar 35 into the position shown in FIGS. 9 nd 10, wherein the far side is now open in that the aperıre 26 is in alignment with the slot 33. The vacuum vithin the control tube 30 now serves to rapidly withdraw the material from the hopper 11 and the pan 14 until the major portion of the material has been removed in this manner. In the probe operation the opening 50 is in registry with the aperture 26 as illustrated in FIG. 1.

Figure 6:
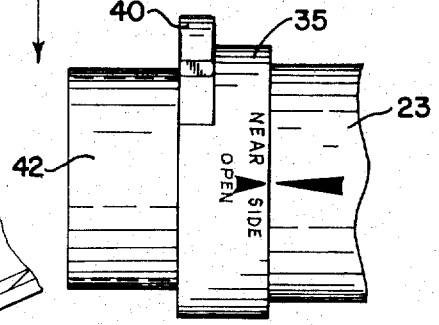
FIG. 6 is a view taken substantially along the line 6— of FIG. 5.
Figure 11:
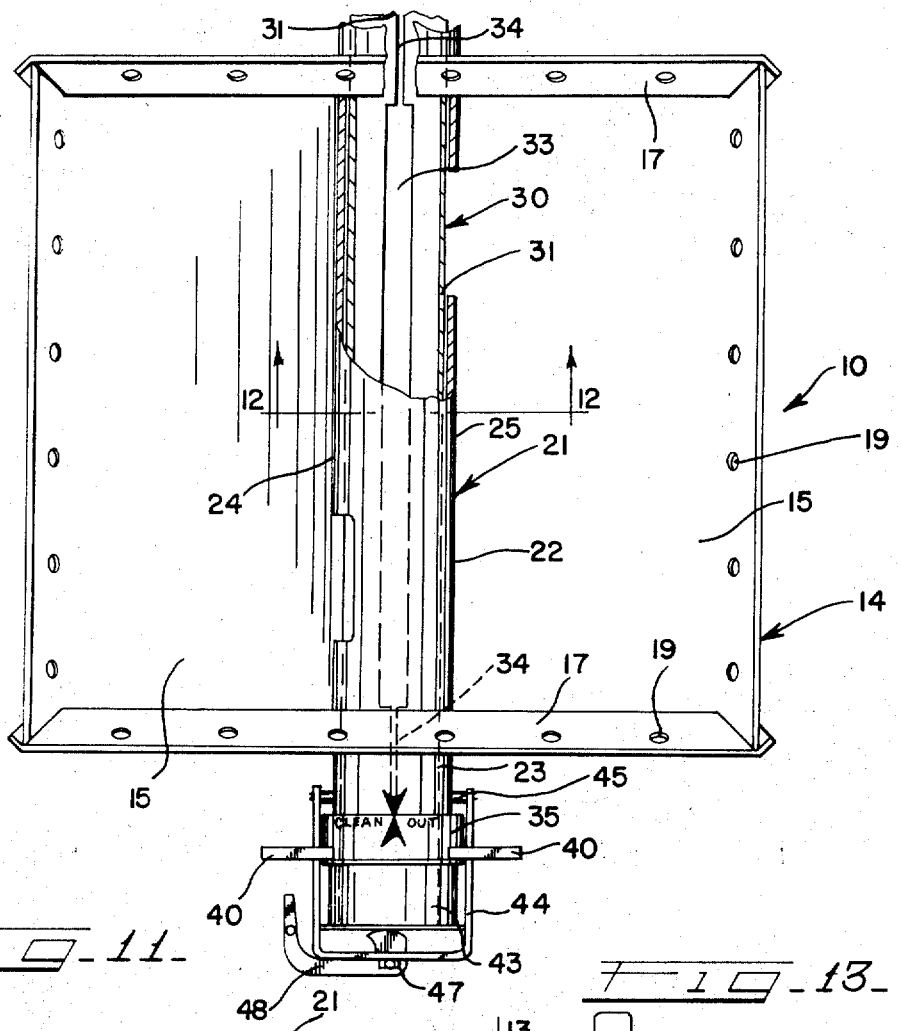
FIG. 11 is a plan view of an outlet assembly in a ce tain operating position.
Figure 12:
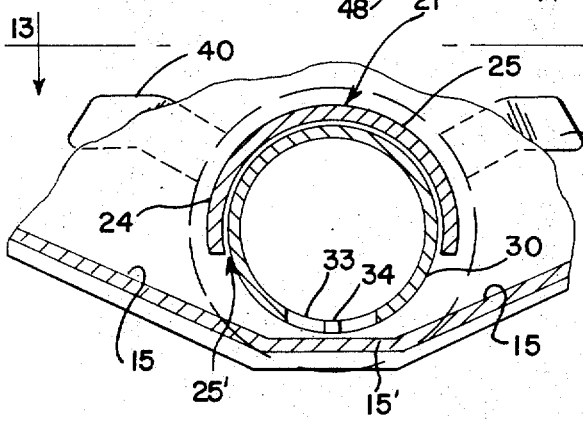
FIG. 12 is a cross-sectional view taken substantiall along the line 12—12 of FIG. 11.
Figure 13:
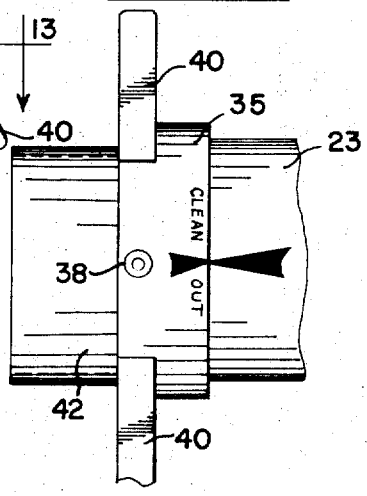
FIG. 13 is a view taken along the line 13—13 of FIC 12.

After the greatest portion of the material has been removed in this manner the control tube 30 is now rotated to the position shown in FIG. 6 wherein the near side is open and as best shown in FIG. 5 the slot 33 is in registry with the aperture 27 for withdrawing material from the other side of the pan. If the probe is utilized, then the probe 49 is moved outwardly and rotated 180° until the opening 50 is in communication or alignment with the aperture 27. A substantial remainder of the material is thus withdrawn from the interior of the hopper and the remaining operation of cleanout is now to be effected. This is accomplished by rotating the control tube 30 into the position shown in FIG. 13 by rotation of the collar 35 and handles 40. In this position, as shown in FIGS. 11 and 12, the slot 33 is now facing downwardly and is substantially contiguous to the horizontal wall 15'. The slot 33 cleans out the residue which may be remaining on the horizontal wall 15' and the slot 34 are now to effectively clean out the spaces 32 provided between the tubular extensions 31 and outer sections 23 as best shown in FIG. 14. The high velocity as a result of suction through the slot 34 causes effective cleanout of the space 32 and in cooperation with the slot 33 efficient and complete cleanout of the pan 14 is effected.

With the improved pneumatic outlet assembly disclosed an efficient operation occurs wherein material is rapidly discharged from the pan 14. Also residue of material remaining after the operation has been completed is no longer a problem since complete cleanout is effected by the arrangement shown. The slot 34 need not necessarily be in communication with the slot 33 to achieve the specific purpose desired. The slot 34 can be staggered and can comprise individual openings as well to achieve the desired function. With the cleanout of the space 32 a more sanitary condition exists and the problem of binding of the control tube 30 during rotation is avoided since material cannot become compacted in the space 32.

What is claimed is:

1. For a hopper having a discharge opening, a pneumatic outlet assembly comprising a pan having horizontally spaced walls and a bottom connected to said hopper beneath said discharge opening to enclose the same and to receive material therefrom.

a tubular member including a tubular inner section disposed beneath said discharge opening, being supported within said pan, and an outer section projecting outwardly from said pan, said tubular inner section having an opening extending horizontally, opening downwardly toward said bottom and being defined by horizontally spaced arcuate wall portions terminating above said bottom, a control tube rotatably positioned within said tubular member including a second opening in an open position being in registry with said first opening, and in closed position, being covered by said wall portions, said control tube having a tubular portion communicating with said second opening and extending outwardly within said outer section, opening means in said tubular portion, means on said tubular portion adapted to connect to vacuum *unloading* [uploading] means, and means for rotating said control tube to open and closed positions, said opening means providing for the cleanout of material disposed within an annular space between said outer section and said tubular portion, and said opening means being substantially longitudinally coextensive with said space.

2. The invention in accordance with claim 1, said opening means having a cross-sectional dimension substantially less than that of said second opening.

3. The invention in accordance with claim 1,
said opening means comprising a relatively narrow slot and said second opening comprising an elongated wider slot.

4. The invention in accordance with claim 3,
said narrow slot communicating with said second slot[,].

5. The invention in accordance with claim 4,
said rotating means including a collar connected to said control tube, said collar having an annular flange overlapping an end of said outer section,
seal means on said flange engaging said end in sealing and siliding relation, and
handle means connected to said collar.

6. The invention in accordance with claim 5,
including a sleeve disposed over said tubular portion of said control tube to provide a circumferentially extending space therebetween, for receiving a tubular connection of a vacuum unloading means.

7. For a hopper having a discharge opening, a pneumatic outlet assembly comprising a pan having horizontally spaced walls and a bottom connected to said hopper beneath said discharge opening to enclose the same and to receive material therefrom,
a tubular member including a tubular inner section disposed beneath said discharge opening, being supported within said pan, and an outer section projecting outwardly from said pan,
said tubular inner section having an elongated slot extending horizontally substantially coextensive with said inner section, opening downwardly toward said bottom and being defined by horizontally spaced arcuate wall portions terminating above said bottom,
said inner section having an aperture disposed in one of said arcuate wall portions adjacent one of said vertical walls of said pan, and a second aperture in said other arcuate wall disposed adjacent the other vertical wall of said pan,
a control tube rotatably positioned within said tubular member including a second slot in an open position being in alignment with said first slot, and in the closed position being covered by said wall portions, said control tube having a tubular portion communicating with said second slot and extending outwardly within said outer section,
means on said tubular portion adapted to connect to vacuum unloading means, and means for rotating said control tube to open and closed positions,
said control tube being rotatable to positions with said second slot registering with either of said apertures providing for the discharge of materials from opposite sides of said pan.

8. The invention in accordance with claim 7,
*said rotating means including a collar connected to the control tube,*
including indicating means on said collar and said [outer section] *tubular portion* denoting the position of said control tube slot relative to said apertures and said first slot.

9. The invention in accordance with claim 7,
said control tube tubular portion including opening means providing for the cleanout of material disposed within an annular space between said outer section and said tubular portion.

10. For a hopper having a discharge opening, a pneumatic outlet assembly comprising a pan connected to said hopper to enclose the same and to receive material from said discharge opening,
a tubular member including a tubular inner section disposed within said pan and an outer tubular section projecting outwardly from said pan, said inner section having an elongated slot in a lower portion of said tube extending horizontally and opening downwardly toward said pan,
a control tube rotatably positioned within said tubular member and having at least one intake opening registering with said elongated slot,
means on said control tube for manually moving the same to register with said slot or to a position relative to said tubular member whereby said intake opening is covered,
said control tube including a tubular extension projecting outwardly of said pan within said outer tubular section and being of a smaller diameter than said *outer* tubular section to provide therewith an annular space coextensive with the projection of said tubular section, and
opening means on said extension communicating with said space to withdraw materials therefrom during the application of vacuum means to said control tube.

*11. For a hopper having a discharge opening, a pneumatic outlet assembly including a pan having opposite sloping walls, said pan being connected to said hopper to receive material from said discharge opening, the improvement comprising:*
*an elongated tubular member disposed adjacent lower portions of said walls including a first tubular section having a horizontal opening communicating with said pan, and*
*a second tubular section projecting outwardly from said pan,*
*a control tube rotatably positioned within said tubular member having an intake opening adapted to register with said horizontal opening in an open position and being rotatable to another position wherein said intake opening is closed,*
*said control tube including a tubular extension projecting outwardly of said pan within said second tubular section and being of a smaller diameter than said second tubular section to provide therebetween an annular space substantially coextensive with the projection of said second tubular section, and*
*means to clean said annular space including elongated aperture means in said tubular extension communicating with said annular space whereby materials are withdrawn therefrom during the application of vacuum means to said control tube.*

*12. The invention in accordance with claim 11,*
*said intake opening comprising an elongated slot, and said aperture means in said tubular extension comprising a relatively narrower elongated slot.*

References Cited

The following references, cited by the Examiner, are of record in the patented file of this patent or the original patent.

UNITED STATES PATENTS

| | | | |
|---|---|---|---|
| 3,136,584 | 6/1964 | Whitlock | 302—52 |
| 3,258,173 | 6/1966 | Koranda | 302—52 |
| 3,408,117 | 10/1968 | Koranda | 302—52 |
| 3,350,141 | 10/1967 | McGrath | 302—52 |
| 2,650,726 | 9/1953 | Aller et al. | 302—52 X |
| 3,048,449 | 8/1962 | Aller | 302—52 |
| 2,190,727 | 2/1940 | McKenna | 214—83.28 |
| 3,207,560 | 9/1965 | Brown | 302—52 |

FOREIGN PATENTS

| | | | |
|---|---|---|---|
| 657,280 | 2/1963 | Canada | 302—52 |

EVON C. BLUNK, Primary Examiner
W. S. CARSON, Assistant Examiner